United States Patent [19]

Watt

[11] Patent Number: 5,665,227

[45] Date of Patent: Sep. 9, 1997

[54] DUAL-FLOW PROTEIN SKIMMER

[76] Inventor: Ronald Watt, 119 Meadowbrook Ave., Beaconsfield, Quebec, Canada, H9W 5B9

[21] Appl. No.: 563,124

[22] Filed: Nov. 29, 1995

[51] Int. Cl.⁶ .................................. C02F 1/24; A01K 63/04
[52] U.S. Cl. ...................................... 210/169; 210/221.2
[58] Field of Search ............................... 210/169, 221.2; 119/264, 263

[56] References Cited

U.S. PATENT DOCUMENTS

| | | |
|---|---|---|
| 3,419,493 | 12/1968 | Pangle. |
| 3,616,919 | 11/1971 | Feddern. |
| 3,719,278 | 3/1973 | Kolfertz. |
| 3,994,811 | 11/1976 | Cohen et al.. |
| 4,333,829 | 6/1982 | Walther. |
| 4,764,311 | 8/1988 | Klaes. |
| 4,834,872 | 5/1989 | Overath. |
| 4,844,013 | 7/1989 | de Haan et al.. |
| 4,863,594 | 9/1989 | Pedretti. |
| 4,988,436 | 1/1991 | Cole. |
| 5,006,230 | 4/1991 | Votava, III et al.. |
| 5,078,867 | 1/1992 | Danner. |
| 5,084,164 | 1/1992 | Rosario. |
| 5,282,962 | 2/1994 | Chen. |
| 5,562,821 | 10/1996 | Gutierrez-Collazo. |

FOREIGN PATENT DOCUMENTS

| | | |
|---|---|---|
| 2371968 | 7/1978 | France. |
| 2522416 | 12/1976 | Germany. |
| 36 25 323 | 1/1988 | Germany. |
| 58-3619 | 1/1983 | Japan. |

*Primary Examiner*—Thomas M. Lithgow
*Attorney, Agent, or Firm*—Oblon, Spivak, McClelland, Maier & Neustadt, P.C.

[57] ABSTRACT

A protein skimmer for removing impurities in a body of water comprising a first elongated passageway, a second upwardly extending elongated passageway, a fluid path between the passageways to allow fluid travelling in the first passageway to enter the second passageway and a source of air bubbles in fluid communication with the first passageway. The protein skimmer of the present invention allows for the combination of the co-current and the counter-current skimming actions without the need for additional an air feeding mechanism. This is achieved by displacing a body of water upwardly by the use of the air bubbles, which results in a co-current skimming action, and by providing an area for the body of water to flow downward, which, with the air bubbles tendency to rise, results in a counter-current skimming action.

7 Claims, 3 Drawing Sheets

DUAL-FLOW PROTEIN SKIMMER

FIELD OF THE INVENTION

The present invention relates to the art of filtrating fluids, such as aquarium saltwater. In particular the invention relates to a protein skimmer used for removing organic impurities contained in the water of an aquarium.

BACKGROUND TO THE INVENTION

Dissolved organic carbon (DOC) released from fish and other animal waste in saltwater aquariums is neither biodegradable nor easily removed by mechanical or biological filters. Accumulated DOC causes the level of ammonia, nitrites, nitrates, and the potential for unwanted micro algae formation to increase which may be detrimental to the health of the animals populating the aquarium. Moreover, high DOC levels produce an undesirable yellow coloring of the water.

Foam fractionators, also known as protein skimmers, can remove the yellow colouring, greatly reduce toxins and raise overall redox levels in the aquarium to ensure long term, stable conditions for all inhabitants. Protein skimmers function by the adherence of DOC on the surface of fine air bubbles rising in a protein skimmer column. DOC's are essentially surfactants. A surfactant molecule has one site manifesting affinity for water molecules and another site manifesting affinity for air molecules. Thus, rising bubbles in a protein skimmer column, drag away DOC molecules from the coherent body of water. The entrained DOC molecules accumulate as froth on the water surface where it can be manually collected and discarded.

Two main types of protein skimmers are popular with sea water aquarium hobbyists. These can generally be classified in two categories namely the "co-current" type and "counter-current" type. The terms "co-current" and "counter-current" denote the direction of flow of the air bubbles, which have a propensity to rise in water, relative to the direction of water flow. When the air bubbles and the water both travel in the same direction, a protein skimmer is said to be of the "co-current" type, while when the air bubbles and the water travel in opposite directions, the protein skimmer is characterised as a "counter-current" type device. The basic, and least efficient type, is the co-current skimmer. Such a skimmer usually comprises a column and a wooden air diffuser located at the bottom of the column. An air supply conduit feeds air to the diffuser. The water inlet is at the bottom of the column and the outlet is, in some cases, the same as the inlet. In use, the air bubbles stream generated by the diffuser causes water to rise in the column. This pumping action produces a continuous water circulation in the column to expose, over time, the entire water content of the aquarium to the cleansing effect of the air bubble stream.

A known disadvantage of such protein skimmers is the comparatively short residence time of the air bubbles in the water. This reduces the efficiency of the skimmer since the rate of impurities removal depends on the length of time the air bubbles remain in the contaminated body of water.

An improved type of protein skimmer is the counter-current type which comprises a column and an air diffuser located at the bottom of this column. Contrary to the basic co-current type, the water is forced, by a supplemental air lift tube, to descend within the skimmer column against the upward flow of air bubbles resulting in a counter-current action. This counter-current flow greatly increases the air/water exposure time within the column. The result is greater skimmer efficiency in comparison to the co-current type. However, such a skimmer is more expensive to manufacture, requires dual feed air units and generally produces salt deposits which are not aesthetically pleasing.

OBJECTS AND STATEMENT OF THE INVENTION

It is therefore an object of the present invention to provide a protein skimmer which overcomes some or all of the disadvantages of the protein skimmers described above.

It is also an object of the present invention to produce a protein skimmer which combines the co-current and counter-current skimming actions without the need of additional air feeding means.

As embodied and broadly described herein, the invention provides a protein skimmer for removing impurities in water, comprising:

a) an outer tubular member having a top portion and a bottom portion;

b) an inner tubular member having a top portion and a bottom portion, the inner tubular member being mounted within the outer tubular member, wherein the bottom portion of the inner tubular member is adjacent the bottom portion of the outer tubular member and wherein the outer tubular member and the inner tubular member defining therebetween a passage;

c) an air diffuser for connection to an air pump to produce a stream of air bubbles, the air diffuser being mounted in the inner tubular member adjacent the bottom end of the inner tubular member, whereby air bubbles created by the air diffuser rise within the inner tubular member and displace a body of water upwardly until it rises out of the second inner tubular member where at least a portion of the body of water displaced upwardly falls under the effect of gravity into the passageway entraining with it a portion of the air bubbles released by the diffuser.

As embodied and broadly described herein, the invention also provides a protein skimmer for removing impurities in a body of water, the protein skimmer comprising:

a) a first elongated passageway;

b) a second upwardly extending elongated passageway;

c) a fluid path between the first and the second passageways to allow fluid travelling in the first passageway to enter the second passageway;

d) a source of air bubbles in fluid communication with the first passageway, the source of air bubbles providing means for upwardly displacing a body of water in the first passageway as a result of an ascending movement of air bubbles therein, at least part of the body of water upwardly displaced by the air bubbles being caused to flow under the effect of gravity in the second passageway through the fluid path, the source of air bubbles providing means for producing air bubbles having dimensions such that a portion oft he air bubbles released in said first passageway are trapped in the body of water and entrained through the fluid path to enter the second passageway.

In a preferred embodiment, the invention provides a protein skimmer for removing the impurities in an aquarium, the protein skimmer comprising:

a) a first outer hollow cylinder having a top portion and a bottom portion;

b) a second inner hollow cylinder also having top and bottom portions, the inner hollow cylinder being concentrically secured inside the first outer hollow cylinder so that the bottom portion of the second hollow cylinder is adjacent the bottom portion of the first hollow cylinder, the first outer and second inner hollow cylinder defining therebetween an annular space;

c) a limewood air diffuser connected to an air pump to create air bubbles having a diameter not exceeding 1 mm, the air diffuser being located inside the second hollow cylinder adjacent the bottom portion of the second hollow cylinder;

whereby the air bubbles created by the air diffuser rise within the second hollow cylinder and displaces a body of water upwardly until it rises out of the second hollow cylinder where it falls under the effect of gravity into the annular space.

By the use of first and second tubular members or passageways and by its particular structure, the protein skimmer of the present invention allows for the combination of the co-current and the counter-current skimming actions without the need for additional air feeding means. This is achieved by displacing a body of water upwardly by the use of air bubbles, which results in a co-current skimming action, and by providing an area for the body of water to flow downward, which, with the air bubbles tendency to rise, results in a counter-current skimming action.

Apart from being simple in construction, the protein skimmer of the invention has the advantage of being silent in operation.

Other objects and features of the invention will become apparent by reference to the following specification and to the drawings.

BRIEF DESCRIPTION OF THE DRAWINGS

The following is a description by way of a preferred embodiment, reference being made to the following drawings, in which.

DESCRIPTION OF A PREFERRED EMBODIMENT

Figure 1:
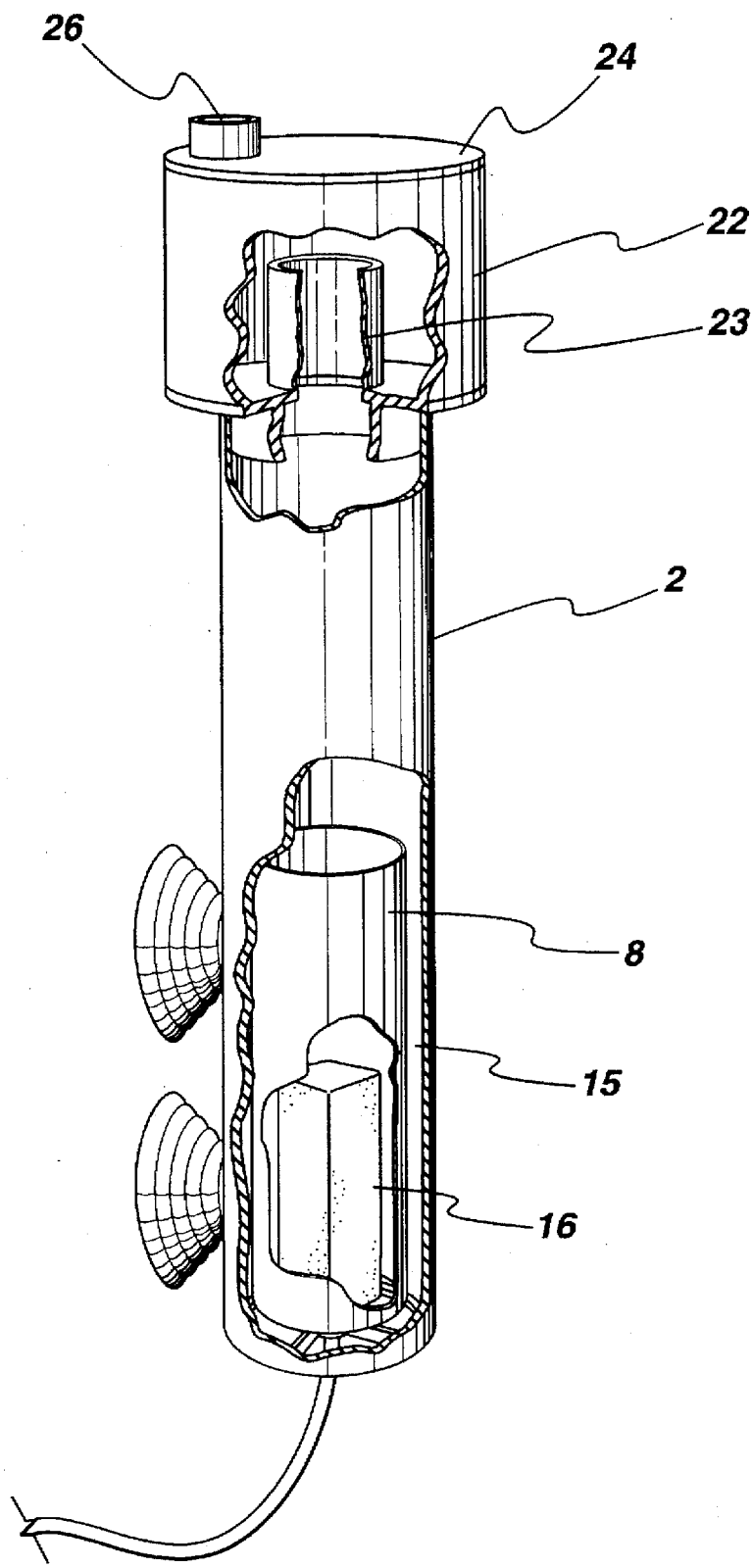
FIG. 1 is a perspective view of the protein skimmer in accordance with the invention with parts broken away to illustrate internal components.
Figure 2:
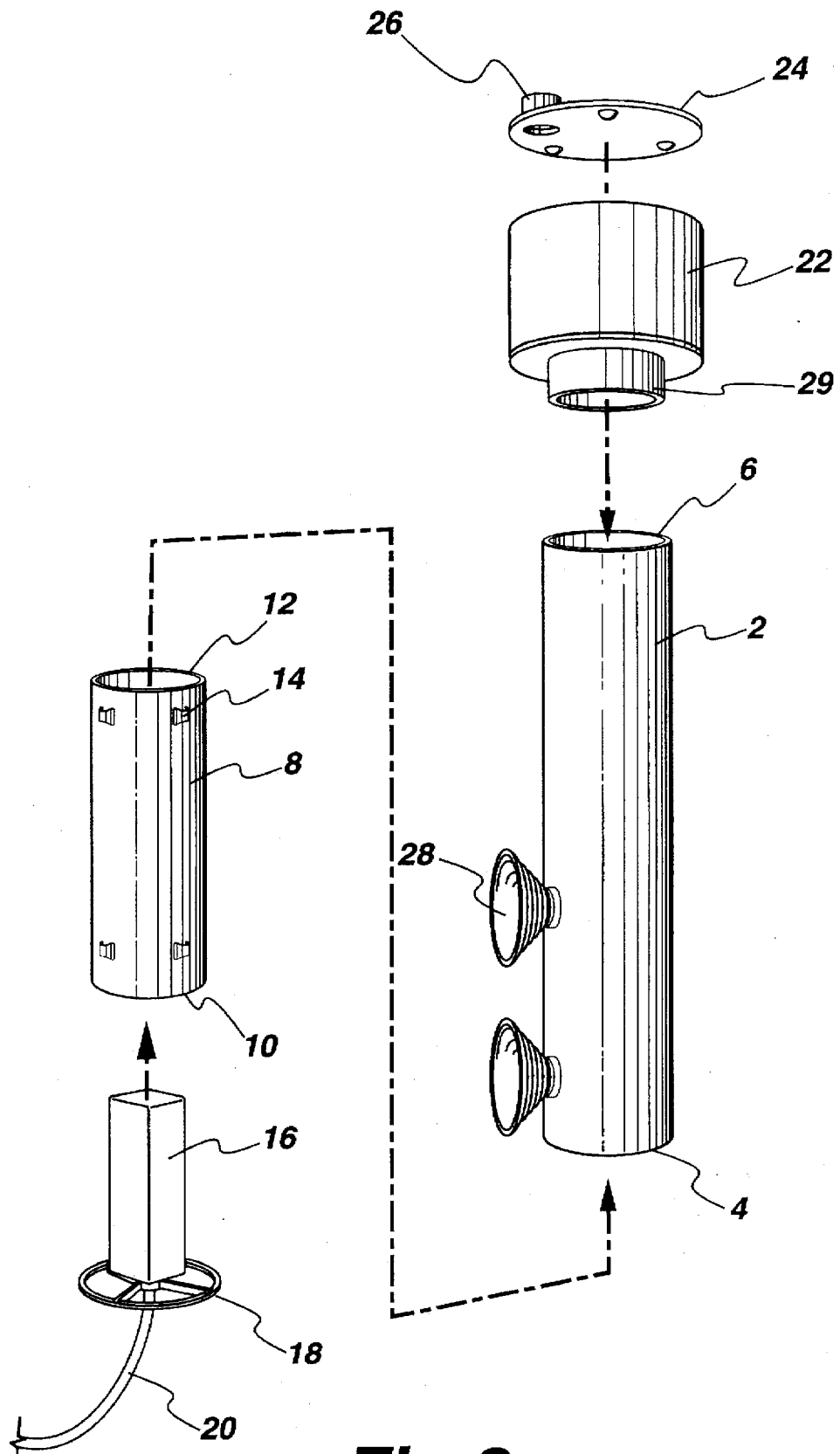
FIG. 2 is an exploded view of the protein skimmer shown in FIG. 1.

The protein skimmer of the present invention is simple in construction and easy to operate. Referring to FIGS. 1 and 2, it comprises an outer tubular member 2, preferably of cylindrical shape, having a top portion 6 and a bottom portion 4. An inner tubular member 8, also of cylindrical shape, is located concentrically within the first outer tubular member 2 by use of spacers 14. The inner tubular member 8 has a top portion 12 and a bottom portion 10. An air diffuser 16 is located inside the second inner tubular member 8 by means of a collar 18 frictionally fixed to the inside wall of the outer tubular member 2. The air diffuser consists of a porous wooden block comprising a hole which is pierced across the direction of the grain. The first end of a tube 20 is inserted into the hole while the other end is connected to an air pump (not shown). A preferred type of air diffuser is a limewood block sold under the trade mark AQUASYS (available from Wattronics of Beaconsfield, Quebec, Canada).

The protein skimmer of the present invention also comprises a removable protein collection cup 22 installed on the top portion 6 of the outer tubular member 2 to collect the protein. The collection cup 22 includes an internal collar 23 which forms a ring-shaped collection chamber 27 in which the protein froth accumulates. The collection cup 22 is closed by a cover 24 with a vent opening 26. The purpose of the vent opening 26 is to allow excess pressure produced by the incoming air bubbles stream to escape. The collection cup 22 is mounted to the outer tubular member 2 by a downwardly projecting collar 29 that frictionally engages the inner wall of the outer tubular member 2.

The protein skimmer can comprise suction cups such as those illustrated at 28 to secure it to the inside wall of an aquarium.

The first and second tubular members (2,8) and the collection cup 22 are made of a suitable plastic material to avoid any oxidation which could affect the lives of the inhabitants of the aquarium. Preferably the plastic material is transparent to allow the user to monitor the activity taking place in the skimmer and to adjust the skimmer accordingly. The second inner tubular member 8 preferably has a reduced wall thickness allowing it to occupy as little volume as possible within the skimmer. As to the relative size of the tubular members, it has been found that a ratio of the outside diameter of the inner tubular member 8 versus the inside diameter of the outer tubular member 2, varying in a range between 0.4 and 0.6 has provided satisfactory results.

In operation, the protein skimmer is mounted to the inside wall of an aquarium 30 by using the suction cups 28 so that the top portion 12 of the inner tubular member 8 is at water level. In the preferred embodiment, the top portion 23 of the collection cup 22 should be approximately 5 inches from the water level. This distance reduces the quantity of water being removed as waste and increases the amount of protein removed. Since the rate of protein removal is a function of the residence time of the air bubbles in water, the tubular members 2 and 8 should be made as long as possible to increase the path of travel of the air bubbles released from the air diffuser 16. The maximum tube length corresponds to the water depth. In practice, the tube length will be somewhat less than the water depth to allow sufficient clearance to fit the air pump tube and to permit the free exchange of inlet and outlet water. While the position of the air diffuser 16 may vary within the inner tubular member 8, it is preferably located at the bottom to ensure a maximal residence time of the air bubbles in the water. Similarly, the bottom portion of the inner tubular member is preferably located at the bottom of the outer tubular member to ensure maximal residence time of the air bubbles in the water.

Air is supplied to the air diffuser 16 through a tube 20 which is connected to a suitable air source, such as an air pump (not shown). The air passes through the air diffuser and egresses the diffuser as a stream of fine air bubbles which rise within the second inner tubular member 8. As the bubbles rise, the bubble size increases and the water present in the inner tubular member 8 is displaced upwardly thereby providing a co-current protein skimming effect.

Figure 3:
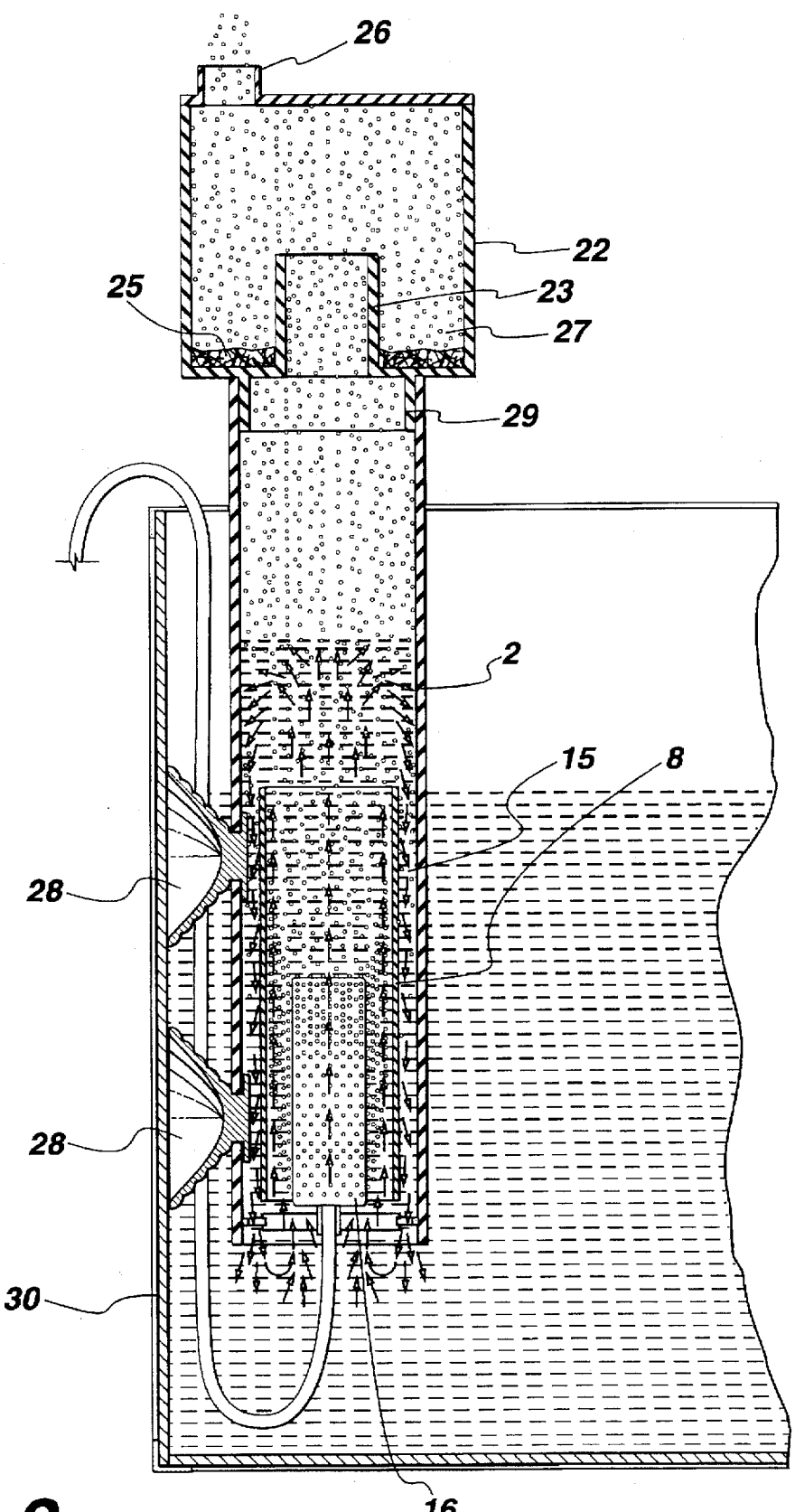
FIG. 3 is a vertical cross-sectional view of the protein skimmer mounted in an aquarium, depicting the operation of the device.

As shown in FIG. 3, the body of water which is displaced upwardly by the air bubbles rises out over the inner tubular member 8 and above the aquarium water level. The volume of air flowing through the air diffuser 16 is adjusted so as to produce within the outer tubular member 2 a head of water rising from about 2.5 to 5 cm above the water level. The bubbles, as they rise and swirl within the inner tube 2, have DOC attracted to them. As the bubbles burst at the top of the water column, the DOC collects as froth. With time, the froth will rise in the top portion 6 of the outer tubular member 8 until the froth eventually overflows into the protein collection chamber 27. The protein waste can periodically be discarded by removing the collection chamber 22 from the outer tubular member 8 and washing it.

The tubular members 2 and 8 are open at the top. This configuration establishes a fluid path between them that allows the body of water raising from the inner tubular member 2 above the water level to flow back, under the effect of gravity in the space 15 between the inner tubular member 2 and the outer tubular member 8. This is shown by the arrows in FIG. 3. The water flowing back in the space 15 entrains with it at least some of the air bubbles. The entrained air bubbles are forced down in the outer tubular member 8 up to a certain point at which the bubbles reverse course and rise. This results in a counter-current protein skimming action.

The average size of the bubbles, measured immediately as they egress the air diffuser 16 influences the efficiency of the protein removal operation. Bubbles having too large of a diameter will have a higher buoyancy and will not have a tendency to return in the space 15 in between the outer tubular member 2 and the inner tubular member 8, thereby reducing the counter-current protein skimming action. Preferably the air bubbles, as they egress the air diffuser 16 have a diameter not substantially exceeding 1 millimeter (mm). Most preferably, the average diameter of the bubbles is in the range from about 0.4 mm to 0.8 mm.

Another advantage of the protein skimmer in accordance with the invention is the fact that the air bubbles released from the air diffuser 16 are for the most part confined to the interior of the protein skimmer thereby making the skimmer silent in operation.

The above description of a preferred embodiment should not be interpreted in any limiting manner since variations and refinements are possible which are within the spirit and scope of the present invention. The scope of the invention is defined in the appended claims and their equivalents.

I claim:

1. A protein skimmer for removing impurities from the water of a saltwater aquarium, said protein skimmer being adapted to be placed in an aquarium, said protein skimmer comprising:

a) a first outer tubular member having an open top portion and an open bottom portion, said open bottom portion of said first outer tubular member having a substantially unobstructed direct communication with the area directly below said first outer tubular member bottom portion whereby water from the aquarium is capable of substantially unobstructed direct flow into and out of the bottom portion of said first outer tubular member;

b) a second inner tubular member having an open top portion and an open bottom portion, said second inner tubular member having a longitudinal dimension which is shorter than a longitudinal dimension of said first outer tubular member, said second inner tubular member being secured inside said first outer tubular member so that the bottom portion of said second inner tubular member is adjacent and in direct fluid communication with the bottom portion of said first outer tubular member, said first outer and said second inner tubular members defining therebetween a space; and c) an air diffuser capable of being connected to an air source to provide air diffusing means for creating air bubbles having a diameter not exceeding 1 mm, said air diffuser being located inside said second inner tubular member adjacent said bottom end of said second inner tubular member;

a foam collector for receiving foam with proteins that overflow the top of said first outer tubular member;

whereby the air bubbles created by the air diffusing means rise within said second inner tubular member and displace a body of water upwardly until it rises out of said second inner tubular member where it falls under the effect of gravity into said space in between said first outer and second inner tubular members.

2. A protein skimmer as defined in claim 1 wherein said first outer tubular member and said second inner tubular member are of cylindrical shape.

3. A protein skimmer as defined in claim 2 wherein the second inner tubular member is concentrically secured within said first outer tubular member.

4. A protein skimmer as defined in claim 1 further comprising an air pump connected to said air diffuser.

5. A protein skimmer as defined in claim 1 further comprising means to secure said skimmer to a wall of an aquarium.

6. A protein skimmer as defined in claim 1 wherein said foam collector for receiving foam comprises a protein collection cup removably secured at the top portion of said first outer tubular member.

7. A protein skimmer for removing impurities in an aquarium, said protein skimmer being adapted to be placed in an aquarium, said protein skimmer comprising:

a) a first outer hollow cylinder having an open top portion and an open bottom portion, said open bottom portion of said first outer hollow cylinder having a substantially unobstructed direct communication with the area directly below said first outer hollow cylinder whereby water from the aquarium is capable of substantially unobstructed direct flow into and out of the bottom portion of said first outer hollow cylinder;

b) a second inner hollow cylinder having open top and bottom portions, said inner hollow cylinder being concentrically secured inside said first outer hollow cylinder so that the bottom portion of said second hollow cylinder is adjacent and in direct fluid communication with the bottom portion of said first hollow cylinder, said first outer and second inner hollow cylinders defining therebetween an annular space;

c) a limewood air diffuser connected to an air pump to create air bubbles having a diameter not exceeding 1 mm, said air diffuser being located inside said second hollow cylinder adjacent said bottom portion of said second hollow cylinder; and d) a protein collection cup removably secured at the top portion of said first outer hollow cylinder;

whereby the air bubbles created by the air diffuser rise within the second hollow cylinder and displaces a body of water upwardly until it rises out of said second hollow cylinder where it falls under the effect of gravity into said annular space.

* * * * *